United States Patent

Groner et al.

(10) Patent No.: US 6,813,603 B1
(45) Date of Patent: Nov. 2, 2004

(54) SYSTEM AND METHOD FOR USER CONTROLLED INSERTION OF STANDARDIZED TEXT IN USER SELECTED FIELDS WHILE DICTATING TEXT ENTRIES FOR COMPLETING A FORM

(75) Inventors: Gabriel F. Groner, Palo Alto, CA (US); Jane I. Kundin, San Mateo, CA (US)

(73) Assignee: Korteam International, Inc., Sunnyvale, CA (US)

( * ) Notice: Subject to any disclaimer, the term of this patent is extended or adjusted under 35 U.S.C. 154(b) by 0 days.

(21) Appl. No.: 09/491,526

(22) Filed: Jan. 26, 2000

(51) Int. Cl.[7] .......................... G10L 15/26; G10L 21/00
(52) U.S. Cl. ...................... 704/235; 704/275
(58) Field of Search .................. 704/235, 243, 704/231, 270, 275, 257; 715/530, 531, 533, 534

(56) References Cited

U.S. PATENT DOCUMENTS

| | | | | |
|---|---|---|---|---|
| 5,425,128 A | * | 6/1995 | Morrison | 704/243 |
| 5,619,708 A | | 4/1997 | Ho | 395/767 |
| 5,623,406 A | * | 4/1997 | Ichbiah | 704/3 |
| 5,668,928 A | * | 9/1997 | Groner | 704/243 |
| 5,761,689 A | * | 6/1998 | Rayson et al. | 715/533 |
| 5,799,279 A | | 8/1998 | Gould et al. | 704/725 |
| 5,970,448 A | * | 10/1999 | Goldhor et al. | 704/235 |
| 6,014,626 A | * | 1/2000 | Cohen | 704/271 |
| 6,101,338 A | * | 8/2000 | Bernardi et al. | 396/287 |
| 6,219,644 B1 | * | 4/2001 | VanBuskirk | 704/235 |
| 6,321,226 B1 | * | 11/2001 | Garber et al. | 704/10 |
| 6,377,965 B1 | * | 4/2002 | Hachamovitch et al. | 715/534 |

OTHER PUBLICATIONS

CyberTranscriber for Business. "*Speech-to-Text Capabilities*", 1–2. Available Web Site: www/cybertranscriber.com/gbs/gbs2_0.asp. Accessed on: Feb. 22, 2000.

* cited by examiner

*Primary Examiner*—Richemond Dorvil
*Assistant Examiner*—A. Armstrong
(74) *Attorney, Agent, or Firm*—Morgan, Lewis & Bockius LLP (57) ABSTRACT

A method populates fields of a form. A form has fields and predefined standard responses associated with at least a subset of the fields. Each predefined standard response is associated with a distinct field. A text stream is received, a particular command in the text stream is identified. In response to the particular command, at least one field is populated with the predefined standard response associated with the field.

30 Claims, 10 Drawing Sheets

172 CARDIOLOGY PHYSICAL EXAM FEMALE

PATIENT NAME: __

174 PATIENT ID: __

DATE OF EXAM: __

PHYSICAL EXAMINATION: __[Skin^ HEENT^Neck^Lymph^Thorax and Lungs^ Cardiovascular^Breasts^Abdomen^Genitalia^Rectum^ Musculoskeletal^Neurological^Extremities^Dictation Date^Dictation Time^ Originator Name^]

GENERAL SURVEY: __

VITAL SIGNS: __
    Temperature: __
    Pulse: __
    Respiration: __
    Blood Pressure: __
    Height: __
    Weight: __

186
188
SKIN: __[No rashes, lesions, jaundice, hirsutism, cyanosis, pigmentary changes or vascular abnormalities are noted.]

202
200
204 HEENT: __[Head^Eyes^Ears^]

Head: __[The head is normocephalic and without evidence of trauma. No facial weakness is evident. The patient is alert and oriented.]

206

Eyes: __[Pupils are round, regular, equal and reactive to light. No ptosis is seen. Extraocular motility is intact; no nystagmus is noted. The conjunctivae and sclerae are white and clear bilaterally. Undilated funduscopy shows normal discs and vasculature bilaterally; no hemorrhages or exudates are seen. Arcus senilis is not present. Visual fields are full to gross finger confrontation.]

208

Ears: __[The pinnae are of normal shape. External canals are unremarkable. No tenderness is evident. The patient is able to hear normal conversational tones without difficulty. The typmanic membranes are normal.]

FIG. 4A

CARDIOVASCULAR: __[Cardiac^Peripheral Vascular^]

Cardiac: __[There is no visible precordial bulge. The PMI is palpable in the fifth intercostal space in the MCL. No thrills are palpable. No murmurs, gallops, or rubs are appreciated at the base or apex. There is a normal S1 and S2. Rate is regular.]

Peripheral Vascular: __[Both carotid arteries are palpable and without bruits. The abdominal aorta is not enlarged to palpation and no bruits are heard over the abdomen. Femoral pulses are palpable and without bruits. Pedal pulses are present bilaterally. Varicosities are not present.]

SIGNATURE: __

210     212
Time spent with patient or family: __
214 Records reviewed: __
Medical decision making level: __
198     216    218    196
Dictation Date: __[Dictation Date]
Dictation Time: __[Dictation Time]
Edit Date: __
220 Edit Time: __
Originator Name: __[Originator Name] 222
Assigned Document Authenticator: __

232 CARDIOLOGY PHYSICAL EXAM FEMALE
234 PATIENT NAME: ⌐ ⌐ ╭─240
PATIENT ID: 244 ╲242

DATE OF EXAM: __

PHYSICAL EXAMINATION: __

GENERAL SURVEY: __

VITAL SIGNS:
    Temperature: __
    Pulse: __
    Respiration: __
    Blood Pressure: __
    Height: __

SKIN: __

HEENT: __

Head: __

Eyes: __

Ears: __

CARDIOVASCULAR: __

Cardiac: __

Peripheral Vascular: __

SIGNATURE: __

Time spent with patient or family: __
Records reviewed: __
Medical decision making level: __

Dictation Date: __
Dictation Time: __
Edit Date: __
Edit Time: __
Originator Name: __
Assigned Document Authenticator: __

CARDIOLOGY PHYSICAL EXAM FEMALE

PATIENT NAME: Ann Jones  ⎯312

PATIENT ID: 3579 ⎯320    ⎯316

DATE OF EXAM: __

PHYSICAL EXAMINATION: __

GENERAL SURVEY: __

VITAL SIGNS:
    Temperature: __
    Pulse: __
    Respiration: __
    Blood Pressure: __
    Height: __

SKIN: No rashes, lesions, jaundice, hirsutism, cyanosis, pigmentary changes or vascular abnormalities are noted.__

HEENT: __

> Head: The head is normocephalic and without evidence of trauma. No facial weakness is evident. The patient is alert and oriented.__
>
> Eyes: Pupils are round, regular, equal and reactive to light. No ptosis is seen. Extraocular motility is intact; no nystagmus is noted. The conjunctivae and sclerae are white and clear bilaterally. Undilated funduscopy shows normal discs and vasculature bilaterally; no hemorrhages or exudates are seen. Arcus senilis is not present. Visual fields are full to gross finger confrontation.__
>
> Ears: The pinnae are of normal shape. External canals are unremarkable. No tenderness is evident. The patient is able to hear normal conversational tones without difficulty. The typmanic membranes are normal.__

FIG. 14A

CARDIOVASCULAR: __

Cardiac: here is no visible precordial bulge. The PMI is palpable in the fifth intercostal space in the MCL. No thrills are palpable. No murmurs, gallops, or rubs are appreciated at the base or apex There is a normal S1 and S2. Rate is regular.__

Peripheral Vascular: Both carotid arteries are palpable and without bruits. The abdominal aorta is not enlarged to palpation and no bruits are heard over the abdomen. Femoral pulses are palpable and without bruits. Pedal pulses are present bilaterally. Varicosities are not present.__

SIGNATURE: __

Time spent with patient or family: One hour__
Records reviewed: Old hospital in clinic reports__
Medical decision making level: Moderate__

Dictation Date: 8/25/99__
Dictation Time: 4:02 PM__
Edit Date: __
Edit Time: __
Originator Name: Jane__
Assigned Document Authenticator: __

FIG. 14B

```
Field Heading 1: __ [Field Heading 2^ ... ^Field Heading M^]
```
            ⌐330

```
Field Heading 2^ ... ^Field Heading M^
```
            ⌐333

FIG. 17

```
Field Heading 1: __ [Response 1 | Response 2 | ... | Response N]
```
342                                                              340

```
Response 1 | Response 2 | ... | Response N
```
            ⌐352

FIG. 20

SYSTEM AND METHOD FOR USER CONTROLLED INSERTION OF STANDARDIZED TEXT IN USER SELECTED FIELDS WHILE DICTATING TEXT ENTRIES FOR COMPLETING A FORM

The present invention relates generally to speech recognition systems as applied to data input and general computer use, and particularly to a system and method for user controlled insertion of standardized text in user selected fields while dictating text entries for completing a form.

BACKGROUND OF THE INVENTION

Many database programs include user interface software and programming tools for defining data entry forms, and for linking fields in those data entry forms to fields in database tables. U.S. Pat. No. 5,619,708 teaches a system and method for converting an existing non-computerized (i.e., paper) data entry form into a computer based data entry form that uses speech recognition for verbal data entry. U.S. Pat. No. 5,619,708 is hereby incorporated by reference.

U.S. Pat. No. 5,668,928 ('928 patent) teaches a system that uses speech recognition to populate forms. When the speech recognition procedures match a user's spoken input with an entry in a currently selected voice syntax file, a speech recognition procedure returns a value that directly identifies a corresponding input value or user command, which may indicate selection of an object in the data form or may be a form navigation command. Other procedures use the detailed information about the end user's spoken words so as to enter dictated sequences of words into data entry fields in the data entry form. U.S. Pat. No. 5,668,928 is hereby incorporated by reference.

In the prior art system of the '928 patent, the populate form procedure was implemented to work with a particular speech recognition procedure. Many vendors supply speech recognition procedures but with different programming interfaces. Because the populate form procedure of the '928 patent is implemented to work with a particular speech recognition procedure, it is difficult for it to use speech recognition procedures from different vendors. Therefore, a method and system that easily allows the populate form procedure to work with different speech recognition procedures is needed.

Although dictation increases the speed of populating forms, dictating each entry field takes a certain amount of time. For example, when completing medical forms to document the results of a physical examination, physicians typically enter "normal" responses to most entries for patients. For each entry that is normal, the normal response is standardized. For example, for a data entry field called "head," the normal response may be "the head is normocephalic and without evidence of trauma. No facial weakness is evident. The patient is alert and oriented." When completing the form, the physician must dictate the text for the "normal response" for each such data entry field. Because the forms have numerous fields, dictating the normal response for each field takes a long time. Therefore, a system and method for user controlled insertion of standardized text in user selected fields while dictating text entries for completing a form is needed.

SUMMARY OF THE INVENTION

A form has fields and predefined standard responses associated with at least a subset of the fields. Each predefined standard response is associated with a distinct field. A text stream is received, a particular command in the text stream is identified. In response to the particular command, at least one field is populated with the predefined standard response associated with the at least one field. In another aspect of the invention, the text stream is generated from audio input. In yet another aspect of the invention, a subset of fields are associated with each other in a hierarchy. The particular command causes all those fields in the hierarchy having predefined standard responses to be populated with their respective predefined standard responses. In this way, by using predefined standard responses, the amount of time to complete a form is reduced.

In an alternate aspect of the invention, the populate form procedure is decoupled from the speech engine to allow a user to choose a speech engine from many vendors. A form builder procedure generates form data representing a form with entry fields. When populating the form, the speech engine generates a text stream from an audio input. The populate form procedure receives and displays the text stream in a current entry field, identifies a particular command in the text stream, and removes the particular command from the text stream in the current entry field. In this way, any one of a number of speech engines may be used without modifying the speech engine or the populate form procedure.

BRIEF DESCRIPTION OF THE DRAWINGS

Additional objects and features of the invention will be more readily apparent from the following detailed description and appended claims when taken in conjunction with the drawings, in which:

DESCRIPTION OF THE PREFERRED EMBODIMENTS

Figure 1:
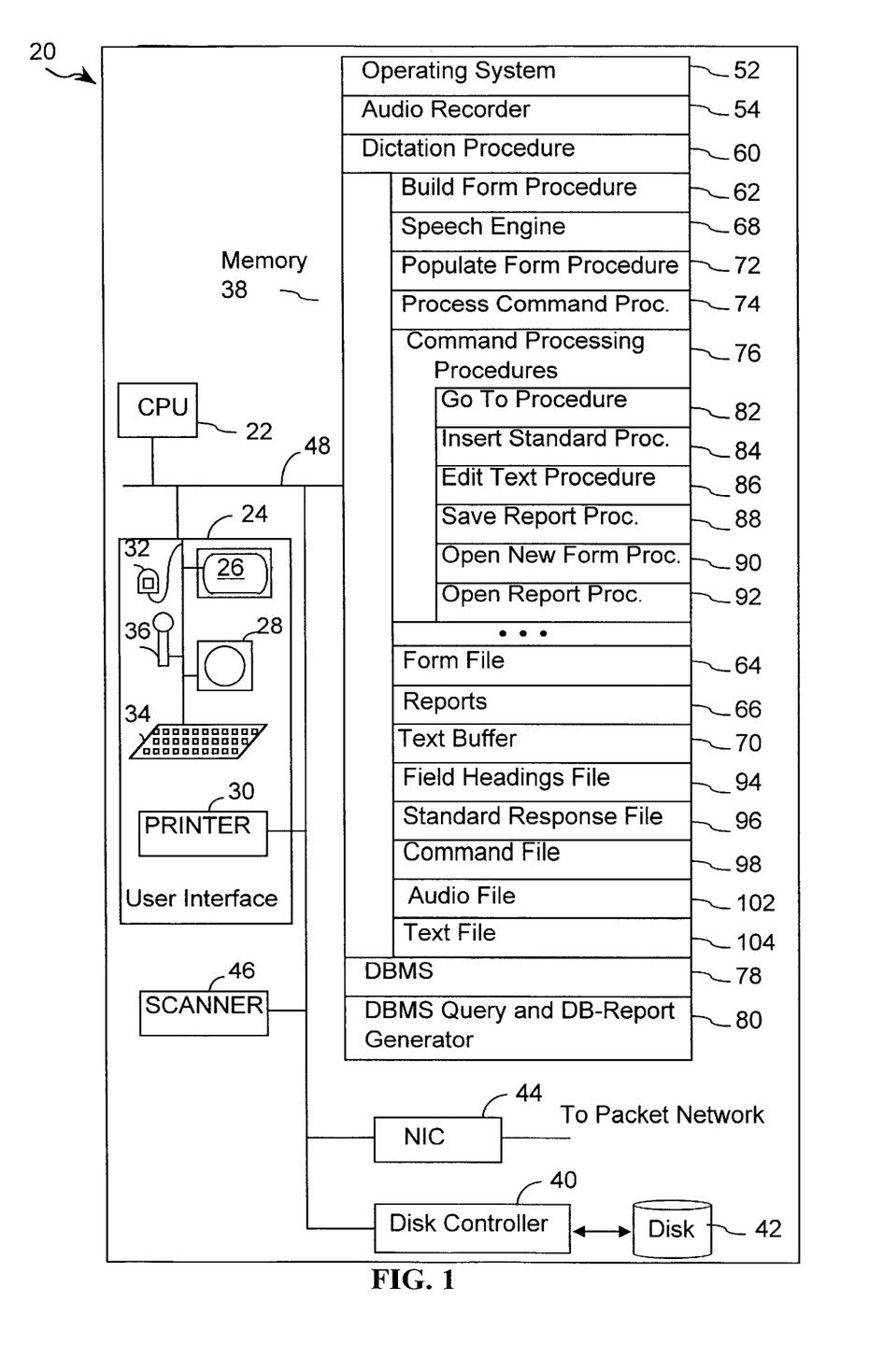
FIG. 1 is a block diagram of a computer system for user controlled insertion of standardized text in user selected fields of a form while dictating text entries for completing the form, where audio data is entered into forms using a variety of input devices, including voice input devices.

Referring to FIG. 1, a computer system 20 implements a dictation system in accordance with an embodiment of the present invention. The dictation system provides for user controlled insertion of standardized text in user selected fields of a form while dictating text entries for completing the form. The computer system 20 includes:

a data processor (CPU) 22;

a user interface 24, including a display 26, a speaker 28 and a printer 30, and one or more input devices, such as a mouse 32, a keyboard 34 and a microphone 36;

a memory 38, which may include random access memory as well as disk storage and other storage media;

a disk controller 40 and disk drive 42 for retrieving information from and storing information to the disk drive 42; the information includes programs and data;

a network interface card (NIC) 44 that provides a packet-based interface for connecting to a remote server via a packet switched network such as the Internet;

a scanner 46 that receives a paper document and generates a scanned document; and one or more buses 48 for interconnecting the aforementioned elements of the computer system 20.

The memory 38 stores a number of different programs, sometimes herein called procedures, and data structures. The dictation system control programs are executed by the system's processor 22. In a typical implementation, the memory 38 includes:

an operating system 52 that includes procedures for handling various basic system services and for performing hardware dependent tasks; the operating system 52 may include a set of user interface procedures for handling input received from the user interface 24 and displaying the output to the user on the display 26;

an audio recorder procedure 54 that records a user's speech received from the microphone 36 for later audio playback; and a dictation procedure 60 that implements the user controlled insertion of standardized text in user selected fields of a form in accordance with an embodiment of the present invention.

The dictation procedure 60 includes:

a build form procedure 62 that creates a new form file 64 or modifies an existing form file that is used as a template from which reports 66 will be generated;

a speech engine 68 that generates text from audio input and places the generated text in a text buffer 70 of a form 64; the audio input may be supplied by the microphone 36 or the audio recorder procedure 54;

a populate form procedure 72 that generates a report 66 in accordance with a specified form file 64 and that populates entry fields of the report 66 in accordance with specified commands identified from the text in the text buffer 70 to complete the report 66;

a process command procedure 74 that identifies a command in the text placed in the text buffer 70 and invokes a command processing procedure 76;

command processing procedures 76 that implement a specified response to particular commands;

a database management system (DBMS) 78 that stores the text data from each entry field on each report in a predefined format for later retrieval; and DBMS query and database-report generation procedures 80 that access the text data stored in the database management system.

The command processing procedures 76 include:

a go to procedure 82 that is invoked in response to a go to command;

an insert standard procedure 84 in accordance with an embodiment of the present invention, that inserts a predefined standard response into a specified entry field of a form;

an edit text procedure 86 that allows a user to change the text of an entry field of a form;

a save report procedure 88 that saves a report, including any text data entered in an entry field;

an open new form procedure 90 that accesses a specified form file 64 to generate a form from which to generate a report; and an open report procedure 92 that opens a specified, existing report.

The following summarizes the data stored in the memory 38:

at least one form file 64 that stores at least one field heading from an entry field; in an alternate embodiment, the form file 64 stores at least one predefined standard response for at least one field;

at least one report 66, a report 66 is a particular stored form that has a unique designation; the report 66 may be uncompleted, partially completed or fully completed;

the text buffer 70 which stores data, at least temporarily, associated with an entry field;

at least one field headings file 94 that stores the field headings of a form 64.

at least one standard response file 96, one for each form 64 that includes a set of predefined standard responses for at least a subset of the entry fields of the form; in one implementation, an entry field has one predefined standard response; in an alternate implementation, an entry field has one or more predefined standard responses;

a command file 98 that lists the commands;

an audio file 102 that stores the audio input from a user; and a text file 104 that stores the text of the converted audio input.

As will be further described below, a form has entry fields and each entry field can store and display text data in it's text buffer 70. The text buffer 70 is used to pass text from the speech engine 68 to the populate form procedure 72.

The form file 64 is used as a template from which to generate reports 66. The dictation system may have many different templates implemented in different form files 64. For example, in a medical records system, one template may be used for a male patient, and another template may be used for a female patient. The reports 66 store patient specific information. A form file 64 may be used multiple times to generate reports 66 for different patients or the same patient.

Figure 2:
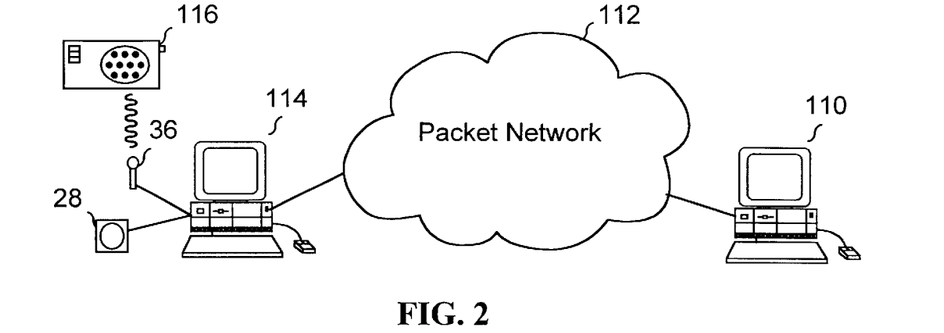
FIG. 2 is a diagram of a network configuration of the system for user controlled insertion of standardized text in user selected fields of a form while dictating text entries for completing the form, in which audio data is supplied to a local computer that transmits the audio or converted text data to a remote computer system that inserts the standardized text in user selected fields.

FIG. 2 is a diagram of an embodiment of the dictation system in a network. This embodiment allows reports to be centrally processed at a remote server 110 via a packet network 112 such as the Internet, and eliminates the need for the local computer system 114 to maintain its own set of dictation procedures including the speech engine 68, build form procedure 62, and populate form procedure 72. The local computer system 114 transmits audio data to the remote computer system 110 via the packet-network 112.

In accordance with commands in the audio data, the remote computer system 110 generates a report 66 (FIG. 1) and inserts the standardized text, or portions thereof, into user selected fields of the report 66. The audio data may be transmitted to the remote computer system 110 as the user is dictating. Alternately, the audio data is transmitted to the remote computer system 110 after the speaker has completed dictation.

Because sending audio data may take a long time, to increase the speed of completing forms, in another embodiment, the local computer system 114 has a speech engine 68 that converts the audio data to text and stores the text in the text file 104 (FIG. 1). The text file 104 (FIG. 1) is sent to the remote server 110 to complete the forms to generate the report 66 (FIG. 1). Since the text file 104 is much, much smaller than the corresponding audio data, transmission of the text file is faster and less expensive than transmission of the audio data.

In the systems of FIGS. 1 and 2, the speaker may record an entire dictation session on an audio tape using a recorder in which the speaker completes many forms. The speaker may give the tape to an assistant to play on a tape player 116 into the microphone 36 to complete the forms. Preferably, the recorder is a digital recorder which has higher fidelity than an audio tape recorder. Alternately, the recorder is an audio tape recorder, that is, a non-digital recorder.

The invention will next be described with respect to creating a form using the build form procedure 62 (FIG. 1), then populating the form using the speech engine 68 (FIG. 1) and populate form procedure 72 (FIG. 1).

Build Form Procedure

Figure 3:
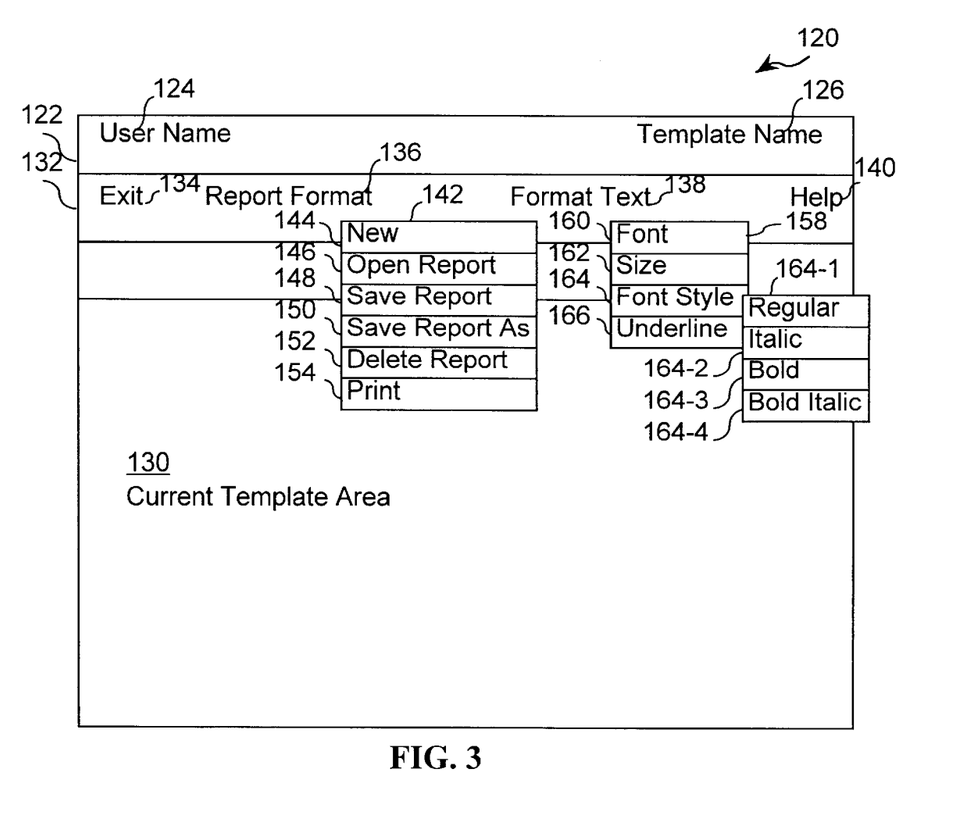
FIG. 3 depicts an exemplary window and menu selections of a graphical user interface of the build form procedure of FIG. 1.

The build form procedure 62 enables a user to define a template by typing ordinary text. As shown in FIG. 3, when activated, the build form procedure 62 (FIG. 1) displays a build-form window 120 which is used to create new forms and modify existing forms. In the build form window 120, a title bar 122 displays the user's name in a "User name" area 124 and the name of the form, if any, in a "Template Name" area 126. A current template area 130 displays the current template. Initially, when no predefined form is selected, the current template area 130 empty. A command bar 132 displays commands that can be selected by the user. The commands include "Exit" 136, "Report Format" 136, "Format Text" 138 and "Help" 140. When a user selects "Report Format" 136, the build form procedure displays a set of menu buttons 142 to give commands that include "New" 144, "Open Report" 146, "Save Report" 148, "Save Report As" 150, "Delete Report" 152 and "Print" 154. When the user selects "Format Text" 138, the build form procedure displays another set of menu buttons 158 that include "Font" 160, "Size" 162, "Font Style" 164 and "Underline" 166 to select the appearance of the text in the current template area. When the user selects "Font Style" 164, the build form procedure displays another set of menu buttons to control the font including: "Regular" 164-1, "Italic" 164-2, "Bold" 164-3 and "Bold Italic" 164-4.

To create a form, the user positions a cursor in the current template area 130 and types the field headings, field associations, standard responses, if any, and other designations that will be discussed below, using a predefined format. To modify the form, the user positions the cursor over any existing field heading, field association, standard responses, and other designations and edits them. The user can also delete field headings, field associations and standard responses in new and existing forms.

Figure 4A:
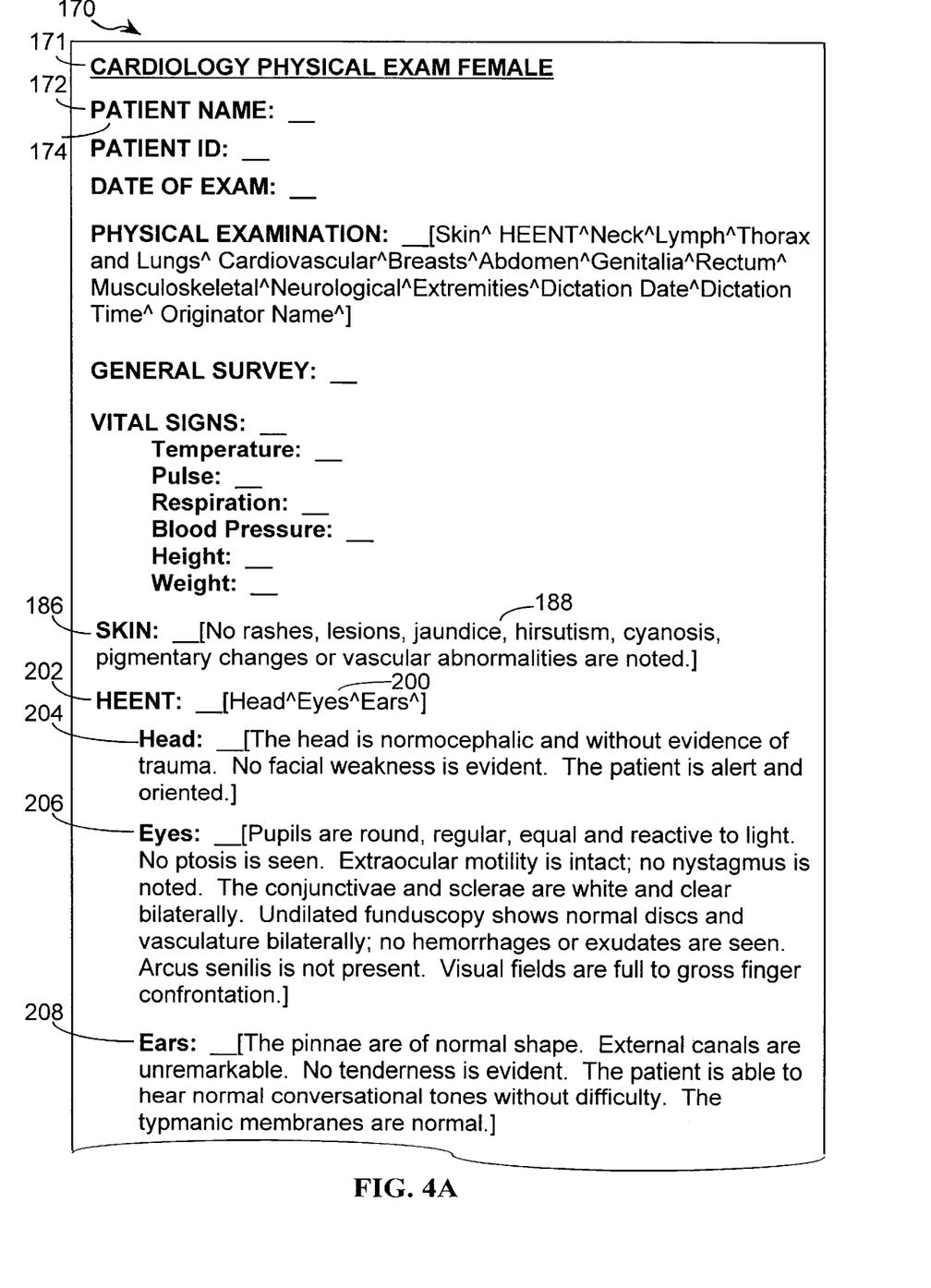
FIGS. 4A and 4B depict an exemplary form with standardized responses shown in brackets that is displayed in a current template area of the graphical user interface of FIG. 3.
Figure 4B:
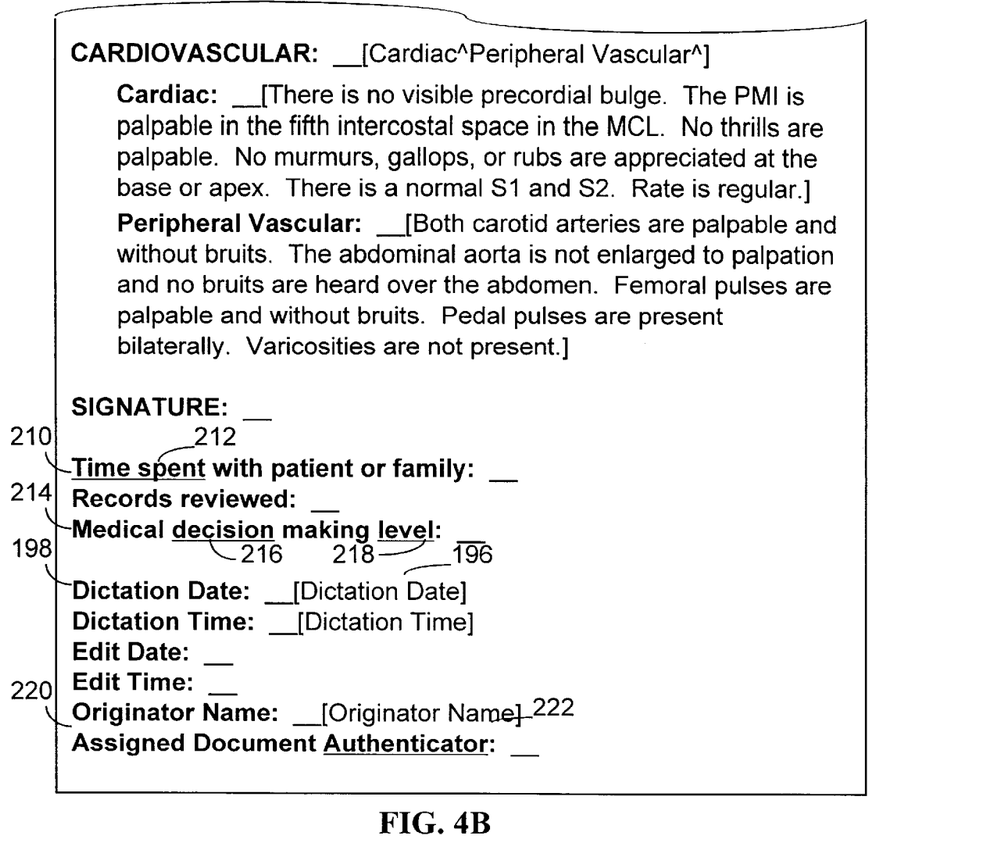
Figure 5:
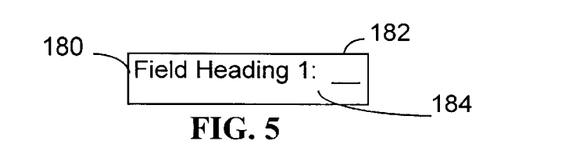
FIG. 5 depicts an exemplary entry field format with no standard response.

FIGS. 4A and 4B depict an exemplary portion of a form 170 that is created and displayed using the build form procedure 62 (FIG. 1). A title 171, for example, "CARDIOLOGY PHYSICAL EXAM FEMALE," is at the top of the form 170. The title is the first non-blank line of a form and does not include a field terminator. The form 170 has entry fields 172 which include a field heading 174. For example, entry field 172 has a field heading 174 called "Patient Name." Referring also to FIG. 5, more generally, a format of an entry field is shown. In the build form procedure, the field heading 180 of an entry field 182 is terminated by a field terminator such as a double underscore ("") 184. The preferred form of entering a field heading includes a colon and two spaces before the field terminator. The title, field headings and field terminators are stored in the form file 64 (FIG. 1) in the order and style in which they appear in the form beginning at the top of the form. The term "style" refers to the font type, font size, and whether the font is regular, bold or italic.

Figure 6:
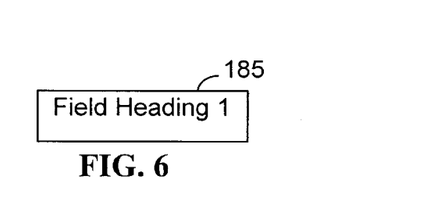
FIG. 6 depicts a data object used to define a field heading of an entry field.

In FIG. 6, a data object 185 that stores the field heading as a record in the field headings file 94 (FIG. 1) is shown. The text of the field heading is stored in the field headings file. The colon, if any, the two spaces, if any, and the field terminator are not stored. The field headings are stored in the field headings file 94 (FIG. 1) in the order in which they appear in the form beginning at the top of the form. For example, the first few lines of the field headings file for the form of FIG. 4A includes the following:

PATIENT NAME

PATIENT ID

DATE OF EXAM

PHYSICAL EXAMINATION

. . . .

Figure 7:
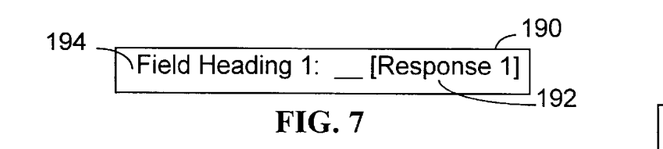
FIG. 7 depicts an exemplary entry field format with one predefined standard response.

Using the build form procedure 62 (FIG. 1), an entry field 186 can be associated with a predefined standard response 188. Referring also to FIG. 7, a format of an entry field having one predefined standard response is shown. Following the field heading 194, text data defines a predefined standard response 192 for that field heading. The predefined standard response 192 follows the field terminator and is enclosed in brackets. This data is stored in the form file 64 (FIG. 1) to define and specify the entry fields of a form.

Figure 8:
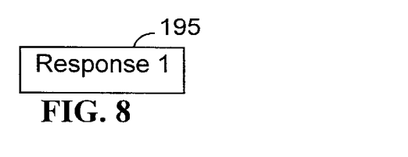
FIG. 8 depicts a data object used to associate an entry field with the text of the predefined standardized response of FIG. 7.

Referring also to FIG. 8, a data object 195 that is used to store the predefined standard response 192 in the standard response file 96 (FIG. 1) is shown. The field heading 194 of the entry field is stored as a record in the field headings file 94 (FIG. 1) and has a record number. The predefined standard response 192 is stored as a record in the standard response file 96 (FIG. 1) with the same record number as the field heading in the field headings file 94 (FIG. 1). For example, for the first few entries of FIG. 4A, the standard response file includes the following:

<empty>
<empty>
<empty>
Skin^HEENT^Neck^Lymph^Thorax and Lungs^Cardiovascular^Breasts^Abdomen^Genitalia^Rectum Musculoskeletal^Neurological^Extremities^Dictation Date^Dictation Time^Originator Name^
<empty>
. . . .
No rashes, lesions, jaundice, hirsutism, cyanosis, pigmentary changes or vascular abnormalities are noted.
. . . .

In the exemplary standard response file above, the designation "<empty>" means that there is no standard response for that record and, in practice, that line would be blank.

Referring back to FIGS. 4A and 4B, for example, for the entry field with the field heading of "SKIN" 186, a user has entered a predefined standard response 188 between brackets.

In another embodiment, a predefined standard response can be either literal text (e.g., "The head is normocephalic and . . . ) or an embedded command that is replaced with text when used. In FIG. 4B, an embedded command 196 is not treated as plain text to insert, but is recognized and executed by the populate form procedure 72 (FIG. 1). The embedded command 196 is predefined and may be a single word or a group of words. For example, in the entry field, "Dictation Date" 198, the predefined standard response is "Dictation Date." The phrase, "Dictation Date," is a predefined embedded command. Subsequently, when the populate form procedure identifies the phrase "Dictation Date," when displaying the form, the populate form procedure will insert and display the present date as the "Dictation Date," rather than the phrase "Dictation Date." To do so, the populate form procedure executes one or more commands to retrieve the present date. Other exemplary embedded commands include "Dictation Time" and "Originator Name."

As will be discussed below with respect to FIG. 15, a predefined standard response 200 of an entry field 202 may also be used to organize the entry fields 202, 204, 206, 208 in a hierarchy.

As shown in FIG. 4B, the build form procedure 62 (FIG. 1) also allows the user to define a particular word or group of words of a field heading as a navigation-keyword that is subsequently used by the populate form procedure to position the cursor at a desired field. The navigation-keyword is identified by underlining the text making up the desired navigation-keyword in the field heading of the form. For example, in the entry field with the field heading "Time spent with patient or family" 210, the words "Time Spent" 212 are underlined. The underlined words do not have to be consecutive. In the entry field with the field heading, "Medical decision making level" 214, the words "decision" 216 and "level" 218 are underlined. For an example of a single navigation-keyword, in the entry field with the field heading "Assigned Document Authenticator" 220, the word "Authenticator" 222 is underlined. The underlining control characters are stored in the form file with the entire text of the field heading. The underlined text of the field heading is stored in the field headings file, rather than the entire text, and is used to identify the navigation-keywords.

When the user saves the form using the "Save" or Save As" buttons, 148 and 150 (FIG. 3), respectively, from the command menu, the build form procedure 62 (FIG. 1) creates several files. The build form procedure stores all fields and predefined responses entered for the form in the form file 64 in the format as the appear on the form, in order from top to bottom, in Rich Text Format. Alternately, fields and predefined responses are stored in the standard Extensible Markup Language (XML) format of the World Wide Web Consortium (W3C), or another format. The build form procedure stores all field headings of the entry fields in the field headings file 94 (FIG. 1). Each field heading is a record in the field headings file and is associated with a record number. The field headings are stored in consecutive order as they appear on the form from top to bottom. The build form procedure also stores the predefined standard responses, as records, in the standard response file 96. A predefined standard response is associated with the same record number as its respective field heading in the field headings file.

In an alternate embodiment, the build form procedure 62 responds to verbal commands to define the entry fields of a form. Alternately, the build form procedure 62 builds a form file or template from a paper document that has been scanned by the scanner 46.

Populating A Form

Figure 9:
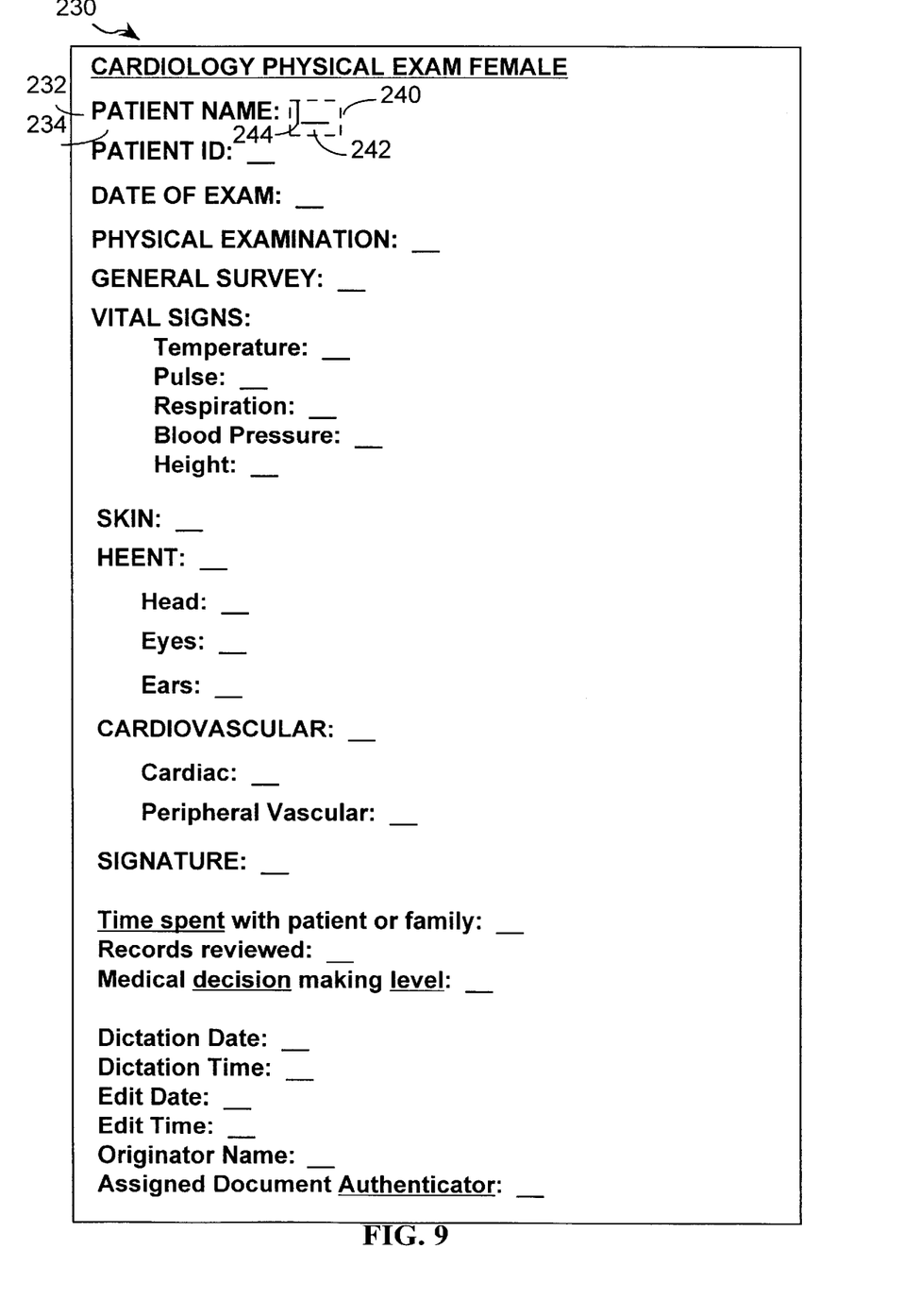
FIG. 9 depicts the exemplary form of FIGS. 4A and 4B as initially displayed by a populate form procedure of FIG. 1 with no populated entry fields.

Referring to FIG. 9, when a new report 230 is generated from a specified form file 64 and displayed on the display 26 (FIG. 1), the populate form procedure 72 (FIG. 1) displays an uppermost portion of the report. Each entry field 232 and field heading 234 is associated with a text buffer 240 into which text is entered. The data displayed in a text buffer 240 is stored, at least temporarily, in the memory (70, FIG. 1). An exemplary text buffer 240 is enclosed by the dashed box, but in practice the dashed box is not displayed. The text buffer 240 is a text window in which data is stored and displayed. In the text buffer 240, the field terminator 242, such as the double underscore symbol, is displayed to indicate the end of the field. An insertion pointer "|" 244 or cursor is displayed in the exemplary text buffer 240. As shown in FIG. 9, the text buffers are empty and do not store text data.

When a new report is to be created from the specified form file, the insertion pointer 244 is positioned in the text buffer 240 of the uppermost entry field 232 of the form 230. The insertion pointer 244 may be repositioned to the text buffers of other entry fields using verbal commands, keyboard commands or the mouse. The text buffer 240 that displays the insertion pointer 244 is the current text buffer, and its respective entry field is the current entry field.

The populate form procedure uses the field terminators to position the insertion pointer at a specified entry field to allow a user to navigate to the various entry fields of the form 230. For example, if a user says "go to date of exam," the populate form procedure will determine that "date of exam" is the third record of the form 230 from the field heading file. Beginning at the top of the form 230, the populate form procedure identifies and counts the number of field terminators. Because the third field terminator is in the entry field for "DATE OF EXAM," the populate form procedure will position the insertion pointer to the left of the third field terminator.

After the form 230 is displayed on the screen, a user can populate the entry fields. Although the text buffers 240 can be populated with data manually using a keyboard, preferably the text buffers 240 are populated with data interactively using the speech engine.

Figure 10:
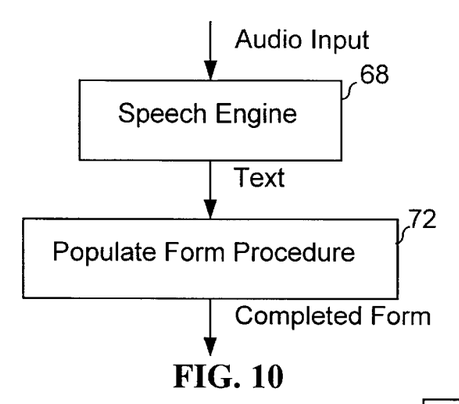
FIG. 10 is a diagram of the procedures invoked by a dictation procedure for user controlled insertion of standardized text in user selected fields while dictating text entries for completing a form of FIG. 1.

FIG. 10 is a diagram of the procedures and flow of data to populate a form in the dictation procedure 60 (FIG. 1) of the present invention. In the dictation procedure 60 (FIG. 1), the speech engine 68 and the populate form procedure 72 operate independently and communicate via the current text buffer 240 (FIG. 9). The speech engine 68 generates text from the audio input and stores the text in the current text buffer 240 (FIG. 9). In other words, the speech engine 68 follows the insertion pointer 244 (FIG. 9) and stores text in the text buffer 240 (FIG. 9) that has the insertion pointer 244

(FIG. 9). Because the speech engine 68 operates independently from the populate form procedure 72 and communicates with the populate form procedure 72 via the current text buffer 240 (FIG. 9), the present invention may be implemented with various speech engines and is not limited to one particular speech engine.

The speech engine 68 and the populate form procedure 72 may be implemented as two separate processes. Although the current text buffer 240 (FIG. 9) is used for communication between the processes, any number of well-known inter-process communication techniques may be used. Alternately, the speech engine 68 and the populate form procedure 72 may be implemented as two independent procedures that execute within a single process (i.e., address space).

In one embodiment, the dictation system is used interactively. To operate the dictation system, the user speaks into the microphone 36 (FIG. 1) to provide audio input to the speech engine 68.

Alternately, the dictation system is used with recorded audio. The speech engine 68 stores the audio input in the audio file 102 (FIG. 1) for later playback, if needed. The speech engine 68 may also store the converted text in the text file 104 (FIG. 1), for later reference if needed. In another alternate embodiment, the dictation system can be used both interactively and with recorded audio.

Figure 11:
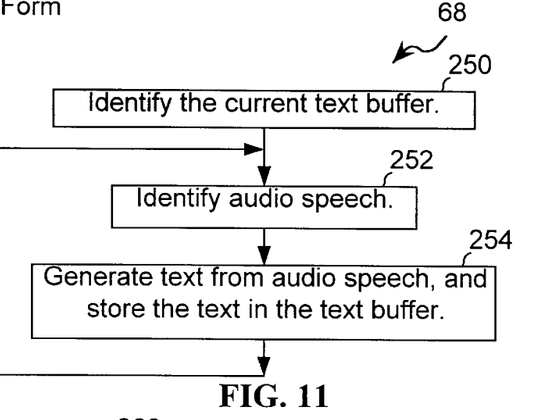
FIG. 11 is a detailed flowchart of a speech engine of FIG. 1.

FIG. 11 is a more detailed flowchart of the speech engine 68 of FIGS. 1 and 10. In step 250, when the speech engine begins executing, the speech engine identifies the current text buffer 240 (FIG. 9), that is, the text buffer that has the insertion pointer. In step 252, the speech engine 68 identifies audio speech. In step 254, the speech engine 68 generates text for each identified word and stores the text in the current text buffer 240 (FIG. 9).

Populate Form Procedure

Figure 12:
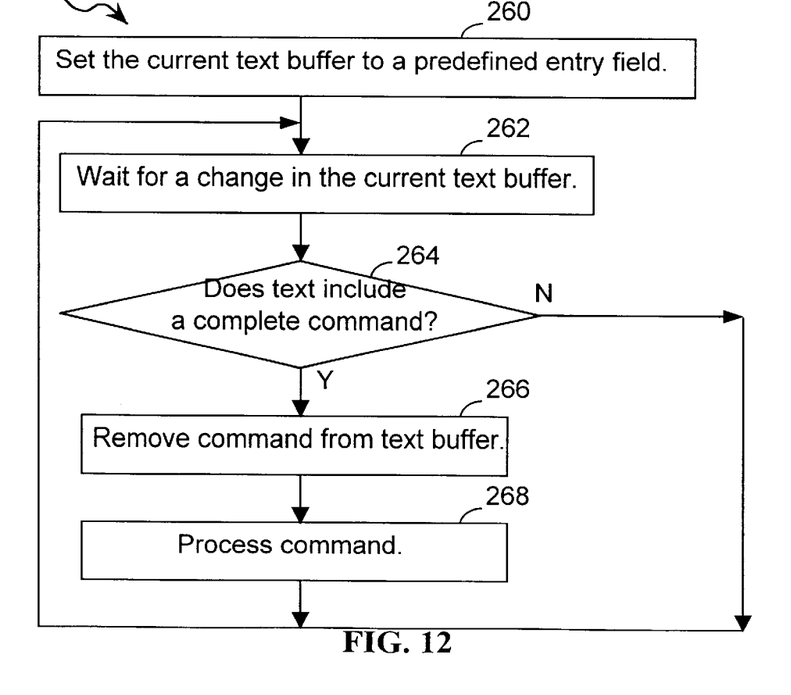
FIG. 12 is a detailed flowchart of the populate form procedure of FIG. 1.

FIG. 12 is a detailed flowchart of the populate form procedure 72 of FIGS. 1 and 10. In step 260, initially the populate form procedure sets the current text buffer by placing the insertion pointer in a predefined entry field. In step 262, the populate form procedure 72 waits for a change in the current text buffer 240 (FIG. 9). The current text buffer is changed with each addition of a character.

Step 264 determines whether the text in the current text buffer 240 (FIG. 9) includes a complete command. When the text includes a complete command, in step 266, the populate form procedure 72 removes the complete command from the text buffer, leaving displayed in the current text buffer whatever text preceded the command. A command may be a single word or a group of words. Because a command can be a group of words, the populate form procedure does not remove text from the current text buffer unless the complete command is identified, otherwise words of a multiple-word command may be removed prematurely and the command may not be found.

In step 268, the populate form procedure 72 processes the command, then proceeds to step 260 to wait for a change to the current text buffer 240 (FIG. 9).

If the text in the current text buffer 240 (FIG. 9) does not include a complete command, in step 264, the populate form procedure 72 proceeds to step 260 to continue to wait for another change in the current text buffer 240 (FIG. 9). The populate form procedure 72 continuously examines the current text buffer 240 (FIG. 9) until a complete command is identified.

For example, suppose the current entry field is Patient Name and the speaker says "Ann Jones next field 3579." The populate form procedure 72 successively receives and displays the following text in the text buffer of the Patient Name field:

A
An
Ann
Ann (with space)
Ann J
Ann Jo
Ann Jon
Ann Jone
Ann Jones
Ann Jones (with space)
Ann Jones n
Ann Jones ne
Ann Jones nex
Ann Jones next
Ann Jones next (with space)
Ann Jones next f
Ann Jones next fi
Ann Jones next fie
Ann Jones next fiel
Ann Jones next field At this point, the command "next field" is complete, therefore the text "next field" is removed from the text buffer (step 266). The text preceding the command, "Ann Jones," remains in the text buffer at the current field, and the insertion pointer is moved to the next field (step 268) where the text "3579" is placed.

Figure 13:
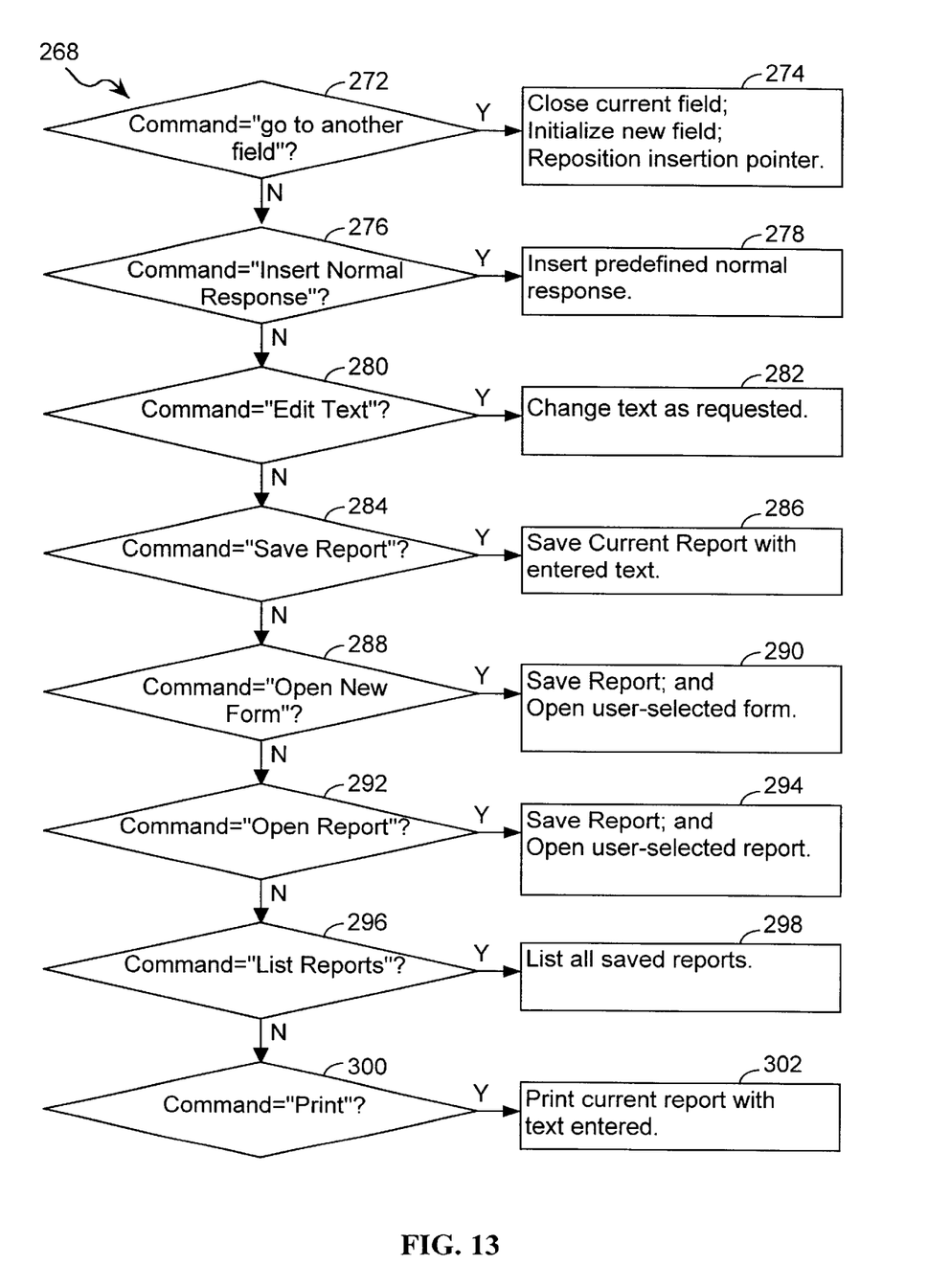
FIG. 13 is a detailed flowchart of a process command step of FIG. 12.

FIG. 13 is a detailed flowchart of the process command step 268 of FIG. 12 implemented by the process command procedure 74 of FIG. 1. The dictation system is responsive to many commands, some of which are identified below. In particular, as will be seen below, the present invention has a command that provides a short-cut for the user when completing forms by providing a predefined standard response for the text data of an entry field.

Each command is associated with a response. In step 272, when the command is "go to 'specified field'," step 274 invokes the "go to" procedure 82 (FIG. 1) which closes the current field, displays the specified entry field with existing text data, if any, and repositions the insertion pointer at the end of any text data in the specified entry field. In the command, the "specified field" may be the "next", "previous", or a particular field heading such as "ears."

In accordance with the present invention, in step 276, when the process command procedure 74 (FIG. 1) determines that the command is "insert normal response," step 278 invokes the insert standard procedure 82 (FIG. 1) which determines whether the current entry field, as shown by the location of the insertion pointer, has a predefined standard response stored in the standard response file 96 for that entry field based on its field heading. The insert standard procedure 82 (FIG. 1) searches the standard response file 96 (FIG. 1) associated with the current form file 64 (FIG. 1). Alternately the insert standard procedure 82 (FIG. 1) searches the form file 64 (FIG. 1) from which the current report was generated. When the insert standard procedure 82 (FIG. 1) identifies a predefined standard response for the current entry field of the current form, the insert standard procedure 82 (FIG. 1) inserts the identified predefined standard response at the location of the insertion pointer in the current text buffer of the current entry field. After inserting the predefined standard response, the insertion pointer remains in the text buffer of the current field, and is positioned at the end of the text making up the predefined standard response.

Alternately, other forms of the "insert normal response" may be used, alone or in combination, such as "insert normals," "insert standard response," "insert standard" and "insert default."

In step 280, when the command is "edit text," the process command procedure 74 (FIG. 1), in step 282, invokes the edit text procedure 86 (FIG. 1) to change the text as requested.

In step 284, when the command is "save report," the process command procedure 74 (FIG. 1), in step 286, invokes the save report procedure 88 (FIG. 1) to save the entered text of the current form as a report 66 (FIG. 1). In one implementation, a report has a record for each field, and the text data for the Nth entry field is stored as the Nth record of the report.

In step 288, when the command is "open new form," the process command procedure 74 (FIG. 1), in step 290, invokes the open new form procedure 90 (FIG. 1) which saves and closes any report that may be open, then opens a user-selected form.

In step 292, when the command is "open report 'name'," the process command procedure 74 (FIG. 1), in step 294, invokes the open report procedure 92 which saves and closes any report that may be open, then opens the report specified by "name." In this case, the named report is not a new report, but an existing report. For an existing report, the form is displayed and any entered text data is retrieved from the database and displayed in the text buffers. In one implementation, because a report has a record for each field, the text data for the Nth entry field is retrieved by reading the Nth record of the report.

In step 296, when the command is "list reports," the process command procedure 74 (FIG. 1), in step 298, invokes a list report procedure that lists all saved reports.

In step 300, when the command is "print," the process command procedure 74 (FIG. 1), in step 302, invokes a print procedure that prints the current form with the entered text.

In a preferred embodiment, the process command function of FIG. 13 is implemented with a "CASE" statement.

Dictation System Operation

Referring back to FIG. 9, when the form is first being populated, the populate form procedure 72 displays an empty form 230 on the display 26 (FIG. 1). An empty form has no text data stored in the entry fields.

Referring also to FIG. 1, to populate a form, a user executes the Dictation Procedure 60 which invokes the speech engine 68 and populate form procedure 72. The user then selects a form file 64 to use as a template for a new report or selects an existing report from their personal list of reports.

Figure 14A:
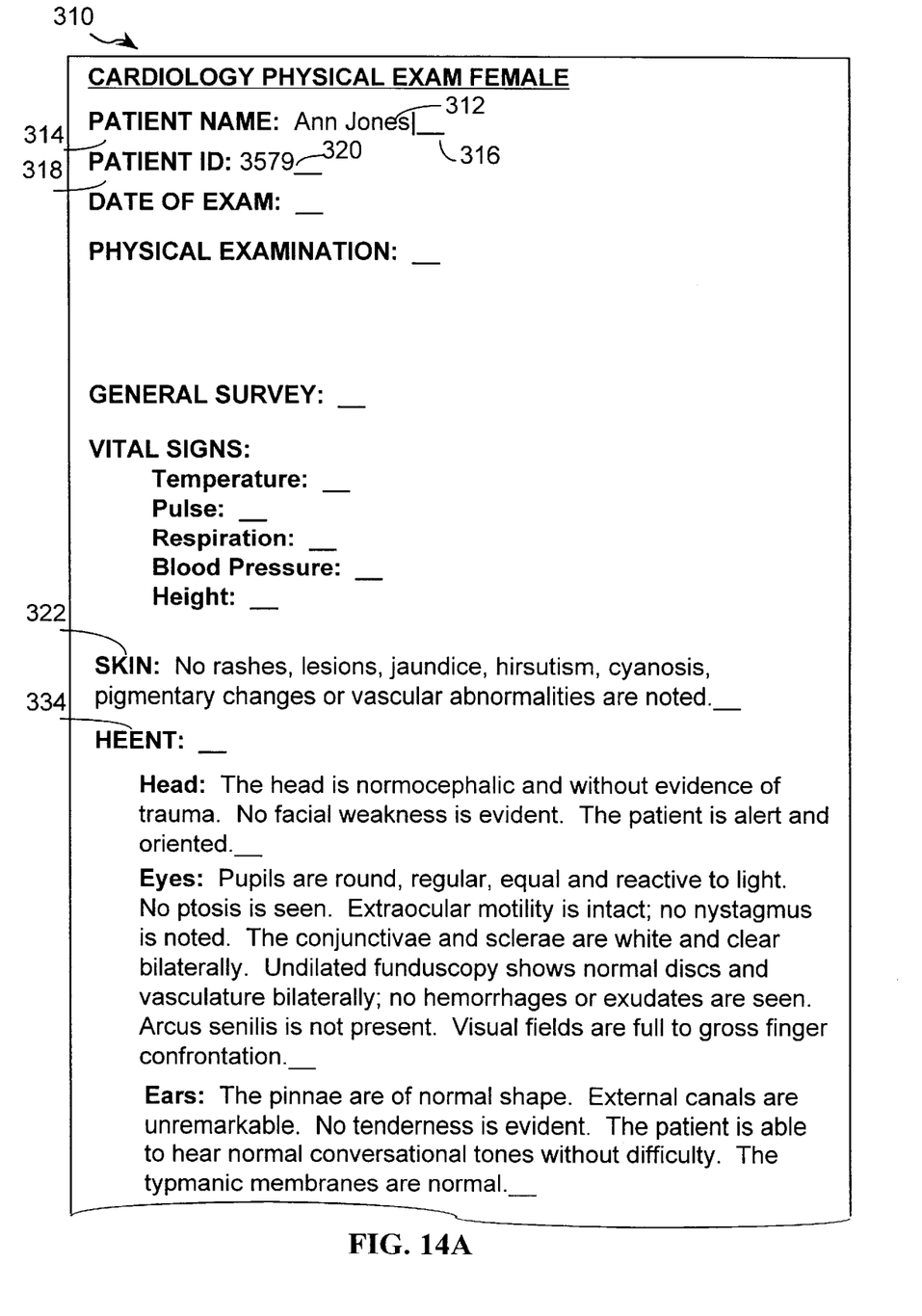
FIGS. 14A and 14B depict the exemplary form of FIG. 9 with populated entry fields, at least a subset of the entry fields including predefined standard responses.
Figure 14B:
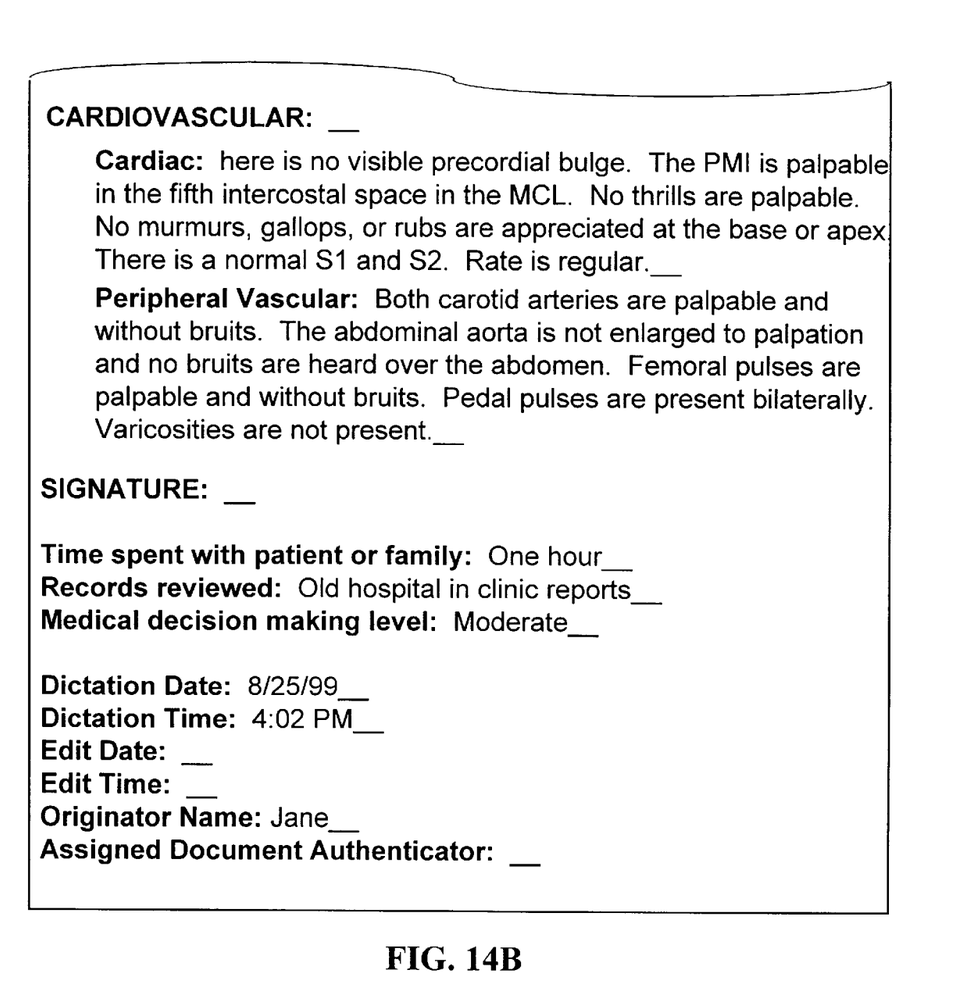

Referring now to FIGS. 14A and 14B, the populate form procedure 72 displays the selected form or report 310 and places the insertion pointer to the left of the field terminator for the first field, even if the first field already stores text data 312. The user may speak a sequence of commands and entry field data or values at any time. The user may navigate to different entry fields of the form in any order. As described above, as the user speaks, the speech engine 68 generates text in accordance with the speech and stores the text in the current text buffer. The populate form procedure 72 scans the text in the current text buffer until a complete command is identified.

Referring back to FIG. 9, for example, the user says "open cardiology physical exam female" and the uppermost portion of the form of FIGS. 3A and 3B is displayed. By default, as shown in FIG. 9, the insertion pointer is positioned to the left of the field terminator, the double underscore, of the first entry field, the Patient Name. The user says "Ann Jones next field 3579." Referring to FIGS. 14A and 14B assuming that this phrase is recognized correctly, except for the five (5), the text "Ann Jones" 312 is placed to the right of the Patient Name field heading 314 followed by a double underscore 316, and the text "next field" is removed from the text buffer.

The populate form procedure 72 interprets the phrase "next field" as a command to reposition the insertion pointer to the next field, the Patient ID 318. The populate form procedure 72 places the remaining text "3979" to the right of the Patient ID field heading 318. The first two fields now appear as follows:

PATIENT NAME: Ann Jones__

PATIENT ID: 3979|$_{13}$

The pipe "|" symbol is the insertion pointer. The user says "delete text." The speech engine 68 recognizes the phrase and places the appropriate text in the current text buffer. The populate form procedure 72 (FIG. 1) identifies the phrase "delete text" as a command and deletes the text "3979 delete text" from the current text buffer of the current entry field. When the user says, "3579 go to skin", the populate form procedure 72 (FIG. 1) places the text "3579 " 320 to the right of the Patient ID field heading. The populate form procedure 72 identifies that "go to skin" is a command, removes that text from the text buffer and moves the insertion pointer to the "Skin" field 322. When the user says "insert normal," the populate form procedure 72 recognizes this as a command and places the predefined standard response 188 (FIG. 4A) in the "Skin" field 322.

A field may have a combination of standardized and non-standardized text. Even after inserting a standard response, that standard response can be edited. Text of the standard response can be deleted and changed, and new text may be inserted at any location of the existing text. In this way, the user can save time, and limit changes to small portions of the text.

Referring to FIG. 14B, in an alternate embodiment, a navigation-keyword is used to position the insertion pointer. For example, the user says "go to time spent." The populate form procedure will move the insertion pointer to the "Time spent with patient and family" entry field because the words "Time Spent" in the field heading were underlined using the build form procedure. Therefore, the user may more easily navigate to the various fields of a form.

Hierarchical Organization of Entry Fields

In another aspect of the invention, a user can populate a group of entry fields with predefined standard responses using a single "insert normal" command. In this way, forms may be completed more efficiently and accurately by reducing user interaction.

Figure 15:
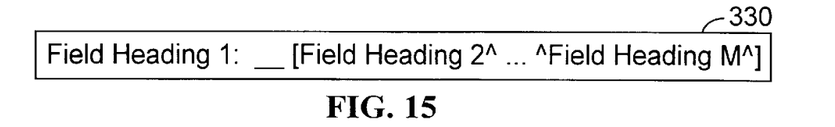
FIG. 15 depicts an exemplary predefined format that defines a hierarchical organization of entry fields.
Figure 16:
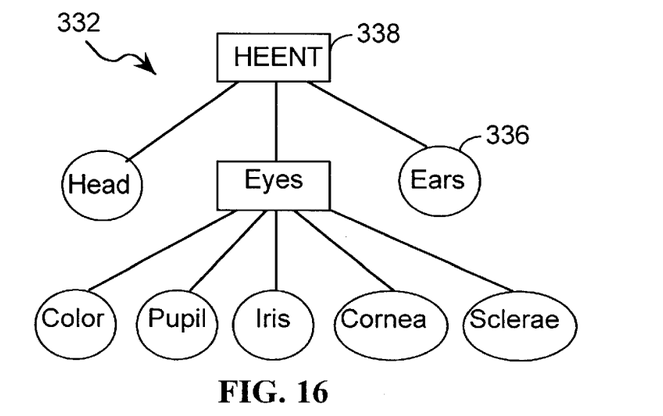
FIG. 16 depicts a tree structure showing the hierarchical organization of entry fields using the predefined format of FIG. 15.

FIG. 15 depicts an exemplary entry field format 330 that includes a predefined hierarchical standard response which defines a hierarchical relationship among entry fields of a form. Referring also to FIG. 16, using this entry field format, the entry fields of a form may be organized into a tree structure 332 with the lowest level (leaf nodes) of the tree storing text data that may include a predefined standard response. As shown in FIG. 15, the field heading of an entry field is used to designate the entry field. The predefined hierarchical standard response is enclosed in brackets. For example, Field Heading 1 is the name of an entry field which is associated with entry fields designated by Field Heading 2 through Field Heading M. Field Heading 1 designates the higher level entry field and Field Headings 2 through M designate the lower level entry fields. In the predefined standardized response, each lower level entry field heading is terminated by a "^." The entry field is stored in the form file 64 (FIG. 1). The field heading is stored in the field headings file 94 (FIG. 1).

Figure 17:
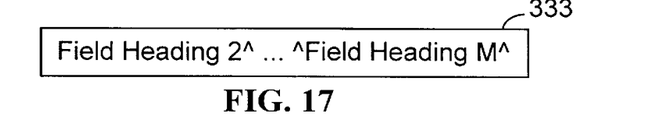
FIG. 17 depicts a data object used to store the defined hierarchical organization of entry fields of FIG. 15.

Referring to FIG. 17, a data object 333 used to store the hierarchical predefined standard response that defines the hierarchical relationship among the entry fields of a form in the standard response file 96 (FIG. 1) is shown. This data object is stored as a record in the standard response file 96

(FIG. 1) at the same record number as its associated field heading in the field headings file 94 (FIG. 1).

Referring back to FIG. 4A, the entry field with the heading "HEENT" 202 uses the entry field format of FIG. 15 to group the entry fields for Head, Eyes and Ears under "HEENT." The entry fields for Head, Eyes and Ears store text data and in this example are leaf nodes.

The entry field format 330 (FIG. 15) and data object 333 (FIG. 17) may be used to establish an even lower hierarchical level. For example, for the entry field "Eyes," the entry field format 330 (FIG. 15) may be used to establish an additional group of entry fields as follows:

Eyes: _[Color^Pupil^Iris^Cornea^Sclerae^]

Referring to FIG. 16, the tree structure 332 shows the relationships between entry fields in accordance with the example above. Entry fields that are leaf nodes which store text data are shown as ovals 336. Entry fields that are higher level nodes that do not store text data are shown as rectangles 338. The entry fields are referred to by their field heading. The "HEENT" entry field is the highest level entry field and is associated with the Head, Eyes and Ears entry field. The Head and Ears entry fields are leaf nodes. The Eyes entry field is an intermediate level entry field that is associated with five entry fields that are leaf nodes: Color, Pupil, Iris, Cornea and Sclerae.

The data object 333 of FIG. 17 is also used to efficiently populate an entire tree of entry fields or a portion of a tree of entry fields by allowing the user to refer to a single higher level node or entry field of the tree 322. For example, when the insertion pointer is at the HEENT entry field and a command to "insert normals" is received, the insert standard procedure 84 (FIG. 1) will populate the Head, Ears, Color, Pupil, Iris, Cornea and Sclerae entry fields with their respective predefined standard response, if any.

The insert standard procedure 84 (FIG. 1) searches the standard response file 96 (FIG. 1) to determine whether the current (HEENT) entry field is associated with a group of entry fields. If so, for each associated field, the insert standard procedure 94 (FIG. 1) searches the standard response file to determine whether that entry field is associated with other entry fields and whether a predefined standard response is defined for that entry field. If a predefined standard response is found, the insert standard procedure 94 (FIG. 1) inserts that predefined standard response in the text data of that entry field.

If the insert standard procedure 94 (FIG. 1) determines that the entry field is associated with other entry fields, the insert standard procedure 94 (FIG. 1) continues to search for each of the other entry fields for additional lower level entry fields and entry fields that are leaf nodes at which to insert a predefined standard response, if any. The insert standard procedure 94 (FIG. 1) continues to traverse the tree structure 332 until all entry fields that are leaf nodes are populated with a predefined normal response, if any.

For example, in FIG. 14A, when the insertion pointer is placed in the "HEENT" entry field 334 and the "insert normal" command is received, the entry fields for "Head," "Eyes" and "Ears" are populated with the predefined standard responses shown in FIG. 4A.

In this way, by eliminating the need for the user to populate each individual entry field with the standard response, a group of entry fields may be populated with a single "insert normal" command. Therefore, the time to complete a form is reduced.

Multiple Standard Responses for a Field

Figure 18:
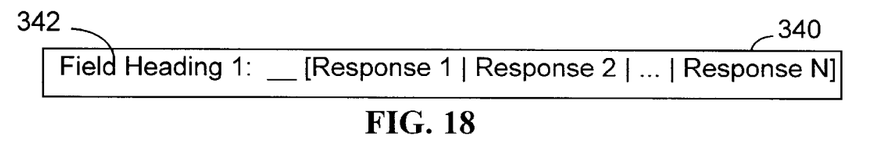
FIG. 18 depicts an exemplary predefined format that associates multiple predefined standardized responses with a specified entry field.

FIG. 18 depicts an entry field format 340 that associates multiple standardized responses with a specified entry field using its field heading. The field heading 342 is followed by multiple standard responses for that field. Following the field terminator, the multiple standardized responses for that field heading are listed between brackets. Each standardized response is separated by a "pipe" (i.e., a "|") character.

Figure 19:
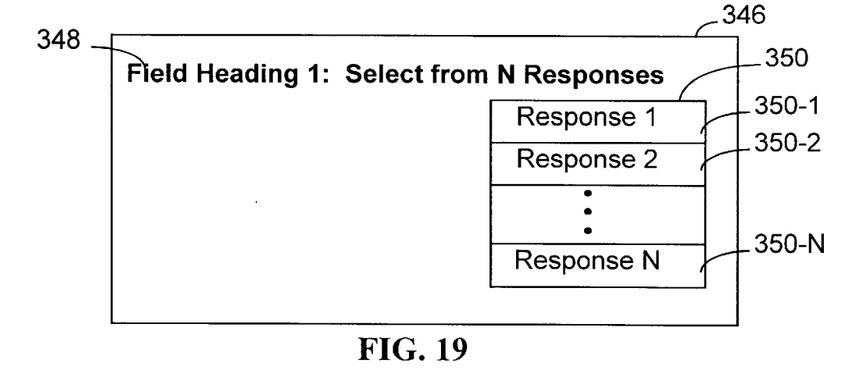
FIG. 19 depicts a portion of an exemplary form displayed on a display that has an entry field associated with multiple standardized responses.

Referring also to FIG. 19, a exemplary portion of a form 346 having an entry field 348 that has multiple standardized responses is shown. When an entry field has multiple standard responses, the insert standard procedure 84 (FIG. 1) displays the field heading and a message such as "Select from N Responses," and a pop-up menu 350 listing the various responses 352. The user selects a response from the pop-up menu 350. If the user does not make a selection, the insert standard procedure 82 (FIG. 1) selects the first response (Response 1) as a default. The text data of the selected response is inserted, by the insert standard procedure 82, into the current entry field.

The user says the number of the response such as "one." Alternately, the user may select a response by speaking the Response, e.g., "Response 1." In another alternate embodiment, the user may select a response using the mouse or keyboard.

Figure 20:
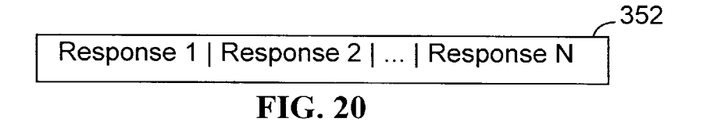
FIG. 20 depicts a data object used to store the associated multiple standardized responses of the specified entry field of FIG. 18.

FIG. 20 depicts a data object 352 that associates multiple predefined standardized responses with a specified entry field. This data object 352 is stored as a record in the standard response file 96 (FIG. 1) at the same record number as its respective field heading in the field headings file 94 (FIG. 1). In addition, the text shown in the entry field format 340 is stored in the form file.

The standard response file stores any combination of data objects shown in FIGS. 8, 17 and 20. In other words the standard response file can include a single predefined standard response, a predefined hierarchical standard response, and multiple predefined standard responses, respectively.

Alternate Embodiments

Although the invention has been described in a medical context, the invention applies to many other contexts including law enforcement, inspection, insurance, education, and law.

The present invention can be implemented as a computer program product that includes a computer program mechanism embedded in a computer readable storage medium. For instance, the computer program product could contain at least a subset of the program modules shown in FIG. 1. These program modules may be stored on a CD-ROM, magnetic disk storage product, or any other computer readable data or program storage product. The software modules in the computer program product may also be distributed electronically, via the Internet or otherwise, by transmission of a computer data signal (in which the software modules are embedded) on a carrier wave.

While the present invention has been described with reference to a few specific embodiments, the description is illustrative of the invention and is not to be construed as limiting the invention. Various modifications may occur to those skilled in the art without departing from the true spirit and scope of the invention as defined by the appended claims.

What is claimed is:

1. A computer program product for use in conjunction with a computer system, the computer program product for populating fields of a form, the computer program product comprising a computer readable storage medium and a computer program mechanism embedded therein, the computer program mechanism comprising:

form data representing a form having fields;

standard response data representing predefined standard responses associated with at least a subset of the fields, each predefined standard response being associated with a distinct field; and a populate form procedure that determines a current field of the form into which dictated text is to be inserted, receives a an initial text stream, identifies a particular complete command in the initial text stream, determines that the particular complete command is a command to insert a standard response associated with the current field, deletes the complete command from the initial text stream leaving a remaining portion of the initial text stream, inserts into the remaining portion of the initial text stream at the position of the deleted command a predefined standard response associated with the current field, and populates the current field with a resulting text stream, the resulting text stream including the redefined standard response and the remaining portion of the initial text stream.

2. The computer program product of claim 1 wherein the current field is associated with one or more other fields to form a hierarchy, and the populate form procedure populates each of the one or more other fields with its respective predefined standard response, if any, in response to the particular complete command.

3. The computer program product of claim 1 wherein at least two predefined standard responses are associated with the current field, the particular complete command in the initial text stream designates one of the at least two predefined standard responses, and the populate form procedure populates the current field with the designated one of the at least two predefined standard responses.

4. The computer program product of claim 1, the computer program mechanism further comprising:

a form builder procedure that generates the form in accordance with the fields, the form builder procedure associating each field with a distinct keyword, the keyword having one or more words, and also associating one or more predefined standard responses with at least one field in the subset of fields.

5. The computer program product of claim 1, the computer program mechanism further comprising:

a speech engine that generates the initial text stream from an audio input.

6. The computer program product of claim 5, the computer program mechanism further comprising:

an audio recorder that stores audio signals and supplies the audio input to the speech engine.

7. The computer program product of claim 1 wherein the particular complete command is an embedded command, and the populate form procedure causes the embedded command to be executed and populates the current field of the form with text data generated by execution of the embedded command.

8. The computer program product of claim 1 wherein the form data includes at least one specified navigation-keyword, the at least one navigation-keyword including one or more words, each specified navigation-keyword being associated with a field, and the populate form procedure identifies a particular specified navigation-keyword in the initial text stream, and populates the field associated with the particular specified navigation-keyword with subsequent text in the initial text stream.

9. A computer program product for use in conjunction with a computer system, the computer program product for populating fields of a form, the computer program product comprising a computer readable storage medium and a computer program mechanism embedded therein, the computer program mechanism comprising:

a form builder procedure that generates a form having a plurality of fields that each have an associated distinct keyword, the keyword having one or more words, and also associating one or more predefined standard responses with at least one field of the plurality of fields; and a populate form procedure that determines a current field of the form into which dictated text is to be inserted based on receipt of the associated keyword, receives a an initial text stream including a particular complete command, identifies the particular complete command in the initial text stream, determines that the particular complete command is a command to insert a particular standard response associated with the current field, deletes the complete command from the initial text stream leaving a remaining portion of the initial text stream, inserts into the remaining portion of the initial text stream at the position of the deleted command the particular standard response associated with the current field, and populates the current field with a resulting text stream, the resulting text stream including the predefined standard response and the remaining portion of the initial text stream.

10. The computer program product of claim 9, the computer program mechanism further comprising:

a speech engine that generates the initial text stream from an audio input.

11. The computer program product of claim 10, the computer program mechanism further comprising:

an audio recorder that stores audio signals and supplies the audio input to the speech engine.

12. The computer program product of claim 9, wherein the form stores medical information for a patient, a subset of the fields store information associated with the patient, and the predefined standard responses represent physician defined descriptions of a normal patient.

13. A method of populating fields of a form comprising:

providing a form having fields and predefined standard responses associated with at least a subset of the fields, each predefined standard response being associated with a distinct field;

determining a current field of the form into which dictated text is to be inserted;

receiving an initial text stream;

identifying a particular complete command in the initial text stream;

determining that the particular complete command is a command to insert a particular standard response associated with the current field;

deleting the complete command from the initial text stream, leaving a remaining portion of the initial text stream;

inserting into the remaining portion of the initial text stream at the position of the deleted command the particular standard response associated with the current field; and populating the current field with a resulting text stream, the resulting text stream including the predefined standard response and the remaining portion of the initial text stream.

14. The method of claim 13 wherein the current field is associated with one or more other fields to form a hierarchy, the method further comprising:

in response to the particular complete command, populating each of the one or more other, fields with its respective predefined standard response, if any.

15. The method of claim 13 wherein at least two predefined standard responses are associated with the current field, the particular complete command in the initial text stream designates one of the at least two predefined standard responses, and the populating of the current field populates that field with the designated one of the at least two predefined standard responses.

16. The method of claim 13 further comprising:

generating the form in accordance with the fields; and associating each field with a distinct keyword, the keyword having one or more words, and also associating one or more predefined standard responses with at least one field in the subset of fields.

17. The method of claim 13 further comprising:

generating the initial text stream from an audio input.

18. The method of claim 17 further comprising:

storing audio signals; and supplying the stored audio signals to provide the audio input.

19. The method of claim 13 wherein the particular complete command is an embedded command, and the step of inserting causes the embedded command to be executed.

20. The method of claim 13 wherein the form includes at least one specified navigation-keyword, the at least one specified navigation-keyword including one or more words, each specified navigation-keyword being associated with a field, and the identifying a particular specified navigation-keyword in the initial text stream, and populating the field associated with the particular specified navigation-keyword with subsequent text in the initial text stream.

21. A system for populating fields of a form comprising:

a central processing unit; and memory for storing data, including:

form data representing a form having fields; and standard response data representing predefined standard responses associated with at least a subset of the fields, each predefined standard response being associated with a distinct field; and a populate form module, executable by the central processing unit, that determines a current field of the form into which dictated text is to be inserted, receives an initial text stream, identifies a particular complete command in the initial text stream, determines that the particular complete command is a command to insert a standard response associated with the current field, deletes the complete command from the initial text stream leaving a remaining portion of the initial text stream, inserts into the remaining portion of the initial text stream at the position of the deleted command the predefined standard response associated with the current field, and populates the current field with a resulting text stream, the resulting text stream including the predefined standard response and the remaining portion of the initial text stream.

22. The system of claim 21 wherein the current field is associated with one or more other fields to form a hierarchy, and the populate form module populates each of the one or more other fields with its respective predefined standard responses, if any, in response to the particular complete command.

23. The system of claim 21 wherein at least two predefined standard responses are associated with the current field, the particular complete command in the initial text stream designates one of the at least two predefined standard responses, and the populate form module populates the current field with the designated one of the at least two predefined standard responses.

24. The system of claim 21 further comprising:

a form builder procedure that generates the form in accordance with the fields, the form builder associating each field with a distinct keyword, the keyword having one or more words, and also associating one or more predefined standard responses with at least one field in the subset of fields.

25. The system of claim 21 further comprising:

a speech engine that generates the initial text stream-from an audio input.

26. The system of claim 25 further comprising:

an audio recorder that stores audio signals and supplies the audio input to the speech engine.

27. The system of claim 21 wherein the particular complete command is an embedded command, and the populate form module causes the embedded command to be executed and populates the current field of the form with data from the execution of the embedded command.

28. The system of claim 21 wherein the form data includes at least one specified navigation-keyword, the at least one specified navigation-keyword including one or more words, each specified navigation-keyword being associated with a field, and the populate form procedure identifies a particular specified navigation-keyword in the initial text stream, and populates the field associated with the particular specified navigation-keyword with subsequent text in the initial text stream.

29. A method of populating fields of a form comprising:

providing form data representing a from having fields;

generating, in a speech engine, a an initial text stream from an audio input;

determining a current field of the form into which dictated text is to be inserted;

identifying a particular complete command in the initial text stream;

determining that the particular complete command is a command to insert a standard response associated with the current field;

deleting the complete command from the initial text stream, leaving a remaining portion of the initial text stream;

inserting into the remaining portion of the initial text stream at the position of the deleted command the predefined standard response associated with the current field; and populating the current field with a resulting text stream, the resulting text stream including the predefined standard response and the remaining portion of the initial text stream.

30. The method of claim 29 wherein the determining a current field, identifying, determining, deleting, inserting and populating are performed by one or more procedures that operate independently of the speech engine.

* * * * *